US012122035B2

(12) United States Patent
Hsieh

(10) Patent No.: US 12,122,035 B2
(45) Date of Patent: Oct. 22, 2024

(54) BUCKLE TYPE FOR MINIMIZING SHAFT LENGTH TOOL PLACEMENT PLATE

(71) Applicant: Chih-Chien Hsieh, Taichung (TW)

(72) Inventor: Chih-Chien Hsieh, Taichung (TW)

( * ) Notice: Subject to any disclaimer, the term of this patent is extended or adjusted under 35 U.S.C. 154(b) by 49 days.

(21) Appl. No.: 18/183,229

(22) Filed: Mar. 14, 2023

(65) Prior Publication Data

US 2024/0308057 A1 Sep. 19, 2024

(51) Int. Cl.
*B25H 3/06* (2006.01)
*B25H 3/00* (2006.01)

(52) U.S. Cl.
CPC ............... *B25H 3/06* (2013.01); *B25H 3/003* (2013.01)

(58) Field of Classification Search
CPC .......... B25H 3/00; B25H 3/006; B25B 13/26; B25B 13/06; B65D 73/0014; B65D 1/36; B65D 85/20
USPC ....... 206/477, 483, 372, 378, 377, 350, 557, 206/558, 559, 560, 561, 564, 565; 483/58, 3; 211/70.6, 162, 94.01, 94.02
See application file for complete search history.

(56) References Cited

U.S. PATENT DOCUMENTS 8,069,995 B2 * 12/2011 Winnard ................ B25H 3/003 211/89.01
8,152,003 B1 * 4/2012 Kao ......................... B25H 3/04 211/94.01
9,126,329 B2 * 9/2015 Kao ..................... F16M 13/022
9,364,949 B2 * 6/2016 Ernst ........................ B25H 3/06
10,919,142 B2 * 2/2021 Hsieh ....................... B25H 3/04
11,453,113 B1 * 9/2022 Hsieh ....................... B25H 3/06
11,667,029 B1 * 6/2023 Hsieh ....................... B25H 3/04 206/372
2001/0001197 A1 * 5/2001 Ramsey ................... B25H 3/06 206/378
2003/0234196 A1 * 12/2003 Hu .......................... B25H 3/04 206/372
2009/0211932 A1 * 8/2009 Schmitt .................. B25H 3/003 206/373
2014/0190853 A1 * 7/2014 Ernst ........................ B25H 3/06 206/378
2015/0122750 A1 * 5/2015 Kao ........................ B25H 3/003 211/13.1
2016/0031074 A1 * 2/2016 Su .......................... B25H 3/003 206/349
2016/0271788 A1 * 9/2016 Hsieh ....................... B25H 3/04
2020/0406447 A1 * 12/2020 Hsieh ....................... B25H 3/04

* cited by examiner

*Primary Examiner* — Steven A. Reynolds
*Assistant Examiner* — Prince Pal
(74) *Attorney, Agent, or Firm* — Egbert, McDaniel & Swartz, PLLC

(57) ABSTRACT

A buckle type tool bar placement plate includes a plate body having a tool bar placement zone. The double-layer frame edge includes first and second side inner walls, an outer side inner wall, and a second side outer wall. A second side opening is formed between the bottom parts of the second side inner wall and the second side outer wall. A side snap unit has an insertion part configured on the first side inner wall, a snap part configured on the second side inner wall, and an operation part controlled from the second side opening. A buckle type limiting piece includes an insertion end, a buckle end and a pressing section. The insertion end is aligned to and assembled with the insertion part of the side snap unit, and the buckle end is aligned to and assembled with the buckle part of the side snap unit.

6 Claims, 6 Drawing Sheets

BUCKLE TYPE FOR MINIMIZING SHAFT LENGTH TOOL PLACEMENT PLATE

CROSS-REFERENCE TO RELATED U.S. APPLICATIONS

Not applicable.

BACKGROUND OF THE INVENTION

1. Field of the Invention

The present invention relates generally to a tool bar placement plate, and more particularly to an innovative structural design of a buckle type tool bar placement plate with minimum shaft length.

2. Description of Related Art Including Information Disclosed Under 37 CFR 1.97 and 37 CFR 1.98

In the tool bar placement plate disclosed in the present invention, the tool bar refers to a bar-shaped seat structure assembled with a plurality of tools (such as a socket set). Then, the bar-shaped seat structure is assembled on a placement plate structure to form a product for placement of tools.

In the structural design of the prior-art tool bar placement plate, as disclosed in U.S. Pat. No. 9,364,949B2 U.S. Patent titled "Slide Rail and Tray for Socket Spanners", the tool bar can slide transversely and can be inserted into a preset transverse slot of the placement box, so that it can be limited and positioned to some extent. However, some problems and shortcomings have been found during actual applications of such prior-art structural designs. For example, because the placement plate must be formed with transverse slots with a sufficient stroke length for insertion, the placement box must correspond to the specification of the tool bar, and must be expanded to some degree in terms of length and volume for the need of placement. As a result, the material cost of the placement box is increased. Moreover, in the aspect of positioning stability, when loaded with tools (such as a socket set), because the tool bar is positioned by means of transverse sliding and assembly, when subject to an inverse force, the tool bar may easily be released from the fixed state. In drop impact tests carried out by manufacturers, the huge impact and shock upon landing of the placement box will cause automatic split and release of the tool bars. Therefore, it is difficult to pass the tests. Also, it poses some safety risks in usage. The common problem of another prior-art tool bar placement plate lies in the releasing mechanism to release the tool bar from the fixed state. It is usually configured on the surface of the tool bar placement plate. Of course, such a configuration is a rational design for convenient operation of the user. However, in practical applications, due to negligent touch by the hand of the user, the tool bar may easily be released from the fixed state.

BRIEF SUMMARY OF THE INVENTION

The main object of the present invention is to provide a buckle type tool bar placement plate with minimum shaft length, aiming to solve the technical problems and make an innovative breakthrough by developing an ideal and practical new structural design of a tool bar placement plate.

In view of the above object, the present invention solves the above problems through the following technical features, characterized mainly in that, the buckle type tool bar placement plate comprises a plate body, having a tool bar placement zone, wherein, based on the extension direction of the tool bar placement zone, a shaft length direction and a lateral direction perpendicular to the shaft length direction are defined. The two ends in the shaft length direction away from each other are formed with a first end directional edge and a second end directional edge, and a vertical direction is defined to be perpendicular to the tool bar placement zone, wherein, a shaft length is relatively defined between the first end directional edge and the second end directional edge.

At least one double-layer frame edge is configured at the at least one corresponding position on the first end directional edge or the second end directional edge, wherein, in the lateral direction, the at least one double-layer frame edge comprises a first side inner wall, a first side outer wall and a second side inner wall, and a second side outer wall configured at intervals. A first side opening is formed between the bottom parts of the first side inner wall and the first side outer wall. A second side opening is formed between the bottom parts of the second side inner wall and the second side outer wall, and specifically, the second side inner wall can be pulled by a force and can be automatically reset through its elasticity.

At least one side snap unit is configured on the at least one double-layer frame edge, comprising an insertion part configured on the first side inner wall, snap part configured on the second side inner wall, and an operation part to release the snap part, and the operation part must be operated from the second side opening. The at least one side snap unit further comprises a limiting piece abutting edge, so that the snap part can be configured between the limiting piece abutting edge and the operation part.

At least one buckle type limiting piece is configured along the lateral direction. The at least one buckle type limiting piece comprises an insertion end, a buckle end and a pressing section located between the insertion end and the buckle end, wherein the insertion end is to be aligned to and assembled with the insertion part of the at least one side snap unit, and the buckle end is to be aligned to and assembled with the snap part of the at least one side snap unit.

The effects and advantages of the invention mainly include the following:

Firstly, the tool bar is placed into the tool bar placement zone along the vertical direction, without the need to move it along the shaft length direction. Therefore, the shaft length of the plate body can be minimized to save material and transportation costs.

Secondly, through the design of the double-layer frame edge, the insertion end and buckle end of the buckle type limiting piece are both hidden inside the inner wall, not accessible by the user. The tool bar can only be released by operating the operation part from the second side opening on the bottom. Therefore, the operational safety is enhanced.

Thirdly, the buckle of the buckle type limiting piece is along the lateral direction, but the drop of the buckle type tool bar placement plate is usually along the shaft length direction, the buckle type limiting piece can provide the tool bar with more stable positioning to avoid separation.

DETAILED DESCRIPTION OF THE INVENTION

Figure 1:
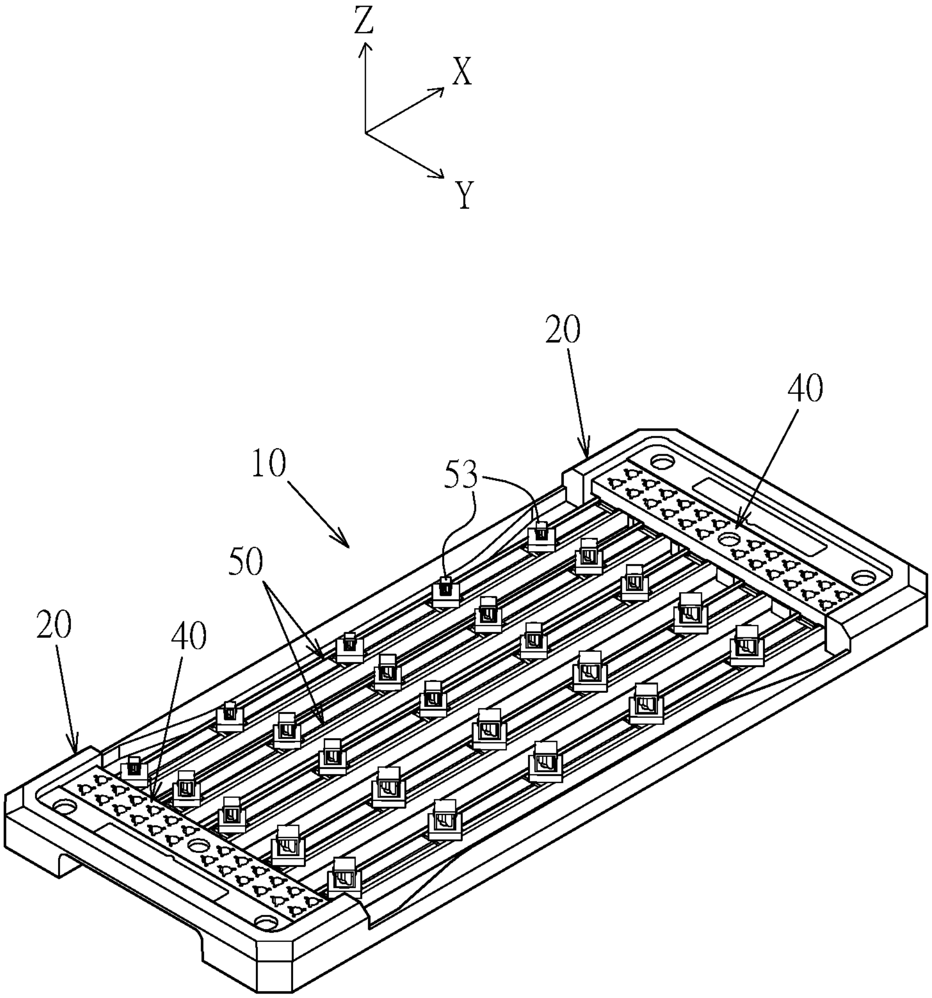
FIG. 1 is a combined perspective view of a preferred embodiment of the invention.

Depicted in FIGS. 1 to 4 are preferred embodiments of the buckle type tool bar placement plate with minimum shaft length according to the invention. However, it is to be noted that such embodiments are for illustrative purpose only and is not intending to limit the scope of the invention.

Said buckle type tool bar placement plate comprises a plate body 10, having a tool bar placement zone 13, wherein, based on the extension direction of the tool bar placement zone 13, a shaft length direction X and a lateral direction Y perpendicular to the shaft length direction X are defined. The two ends of the shaft length direction X away from each other are formed with a first end directional edge 11 and a second end directional edge 12, and a vertical direction Z is defined to be perpendicular to the tool bar placement zone 13. Specifically, a shaft length L1 is defined between the first end directional edge 11 and the second end directional edge 12. At least one double-layer frame edge 20 is configured at the at least one corresponding position on the first end directional edge 11 or the second end directional edge 12 (Note: in the present embodiment, the first end directional edge 11 and second end directional edge 12 are both configured), in the lateral direction Y, each double-layer frame edge 20 comprises a first side inner wall 21, a first side outer wall 22, a second side inner wall 23, and a second side outer wall 24 configured at intervals. A first side opening 25 is formed between the bottom parts of the first side inner wall 21 and the first side outer wall 22, a second side opening 26 is formed between the bottom parts of the second side inner wall 23 and the second side outer wall 24, and specifically, the second side inner wall 23 can be pulled by a force and can be automatically reset through its elasticity. At least one side snap unit 30 is configured on the at least one double-layer frame edge 20, comprising an insertion part 31 configured on the first side inner wall 21, a snap part 32 configured on the second side inner wall 23, and an operation part 33 to release the snap part 32, wherein, the operation part 33 must be operated from the second side opening 26. The side snap unit 30 further comprises a limiting piece abutting edge 34, so that the snap part 32 can be configured between the limiting piece abutting edge 34 and the operation part 33 (Note: As the second side opening 26 is configured on the bottom face away from the limiting piece abutting edge 34, the limiting piece abutting edge 34 will not easily retract under a force). At least one buckle type limiting piece 40 is configured along the lateral direction Y, the at least one buckle type limiting piece 40 comprising an insertion end 41, a buckle end 42 and a pressing section 43 located between the insertion end 41 and the buckle end 42. The insertion end 41 is to be aligned to and assembled with the insertion part 31 of the side snap unit 30, and the buckle end 42 is to be aligned to and assembled with the snap part 32 of the side snap unit 30.

Figure 2:
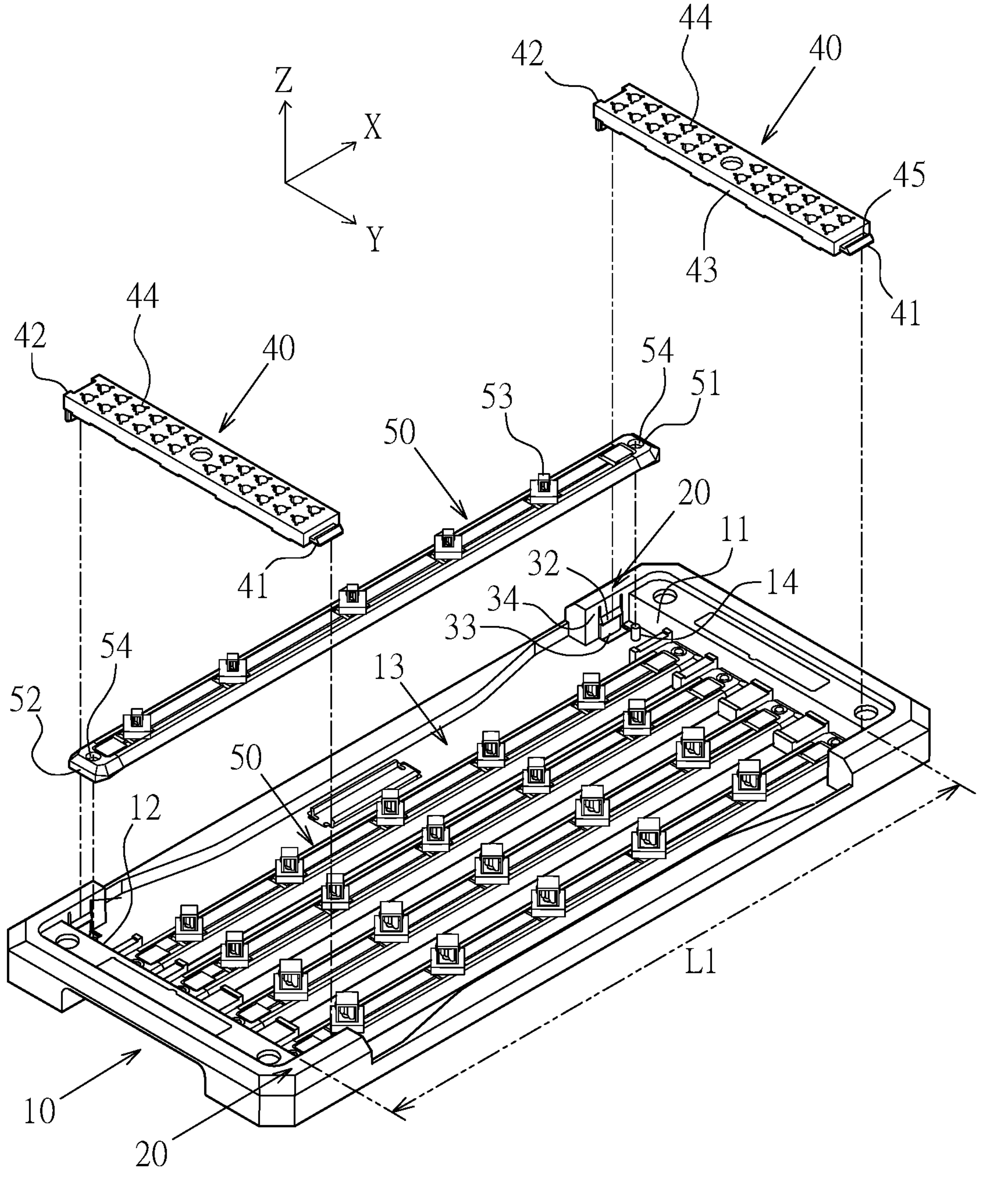
FIG. 2 is an exploded perspective view of partial structure of a preferred embodiment of the invention.

Referring to FIGS. 1 and 2, in the present embodiment, the tool bar placement zone 13 of the plate body 10 is used for placing and limiting a plurality of tool bars 50. Each tool bar 50 is in the shape of a long bar, defined with a first end 51 and a second end 52. Between the first end 51 and the second end 52, there are a plurality of tool positioning parts 53. The first end 51 is assembled toward the first end directional edge 11 of the plate body 10, and the second end 52 is assembled toward the second end directional edge 12, so that each tool bar 50 can move along the vertical direction Z and be placed into the tool bar placement zone 13, and then be pressed on the tool bar 50 structure through the pressing section 43 of the buckle type limiting piece 40. Thus, each tool bar 50 is limited in the corresponding vertical direction Z. (Note: In the present embodiment, the length of the tool bar 50 defined by the space between the first end 51 and the second end 52 is adapted to the shaft length L1.)

Figure 3:
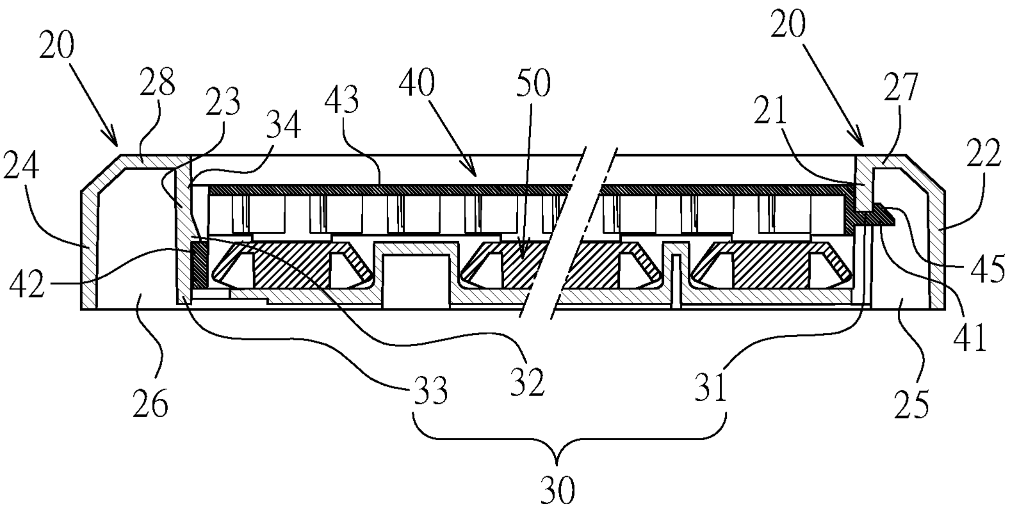
FIG. 3 is a sectional view along the vertical direction of the buckle type limiting piece in a preferred embodiment of the invention.
Figure 4:
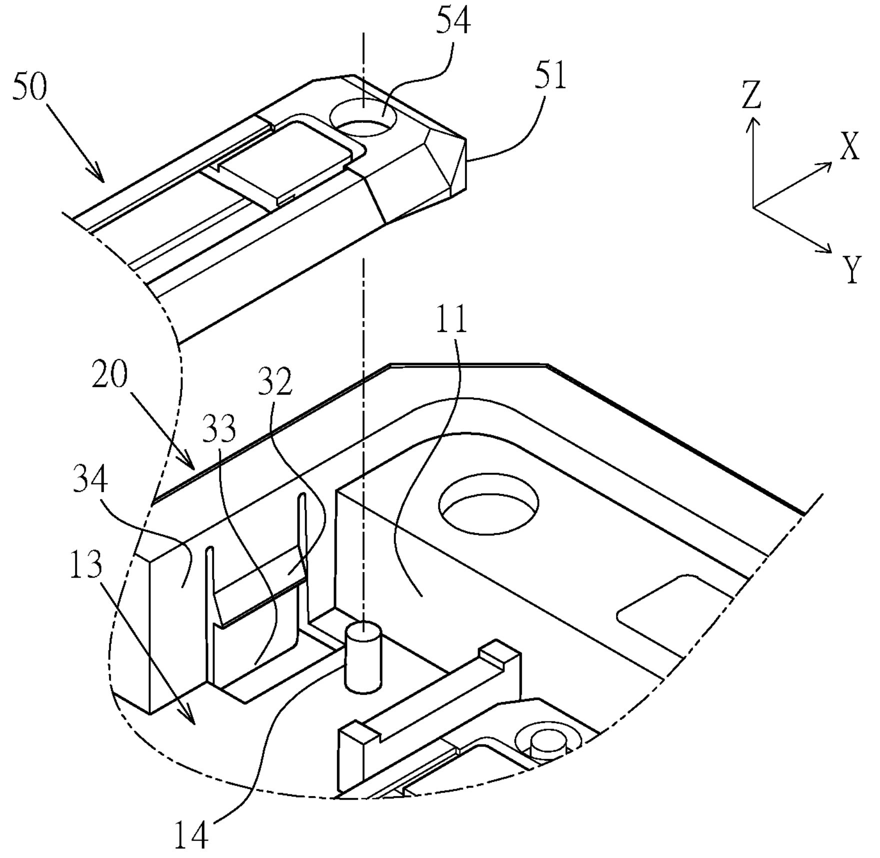
FIG. 4 is an exploded and corresponding relationship view of partial structure in a preferred embodiment of the invention.
Figure 9:
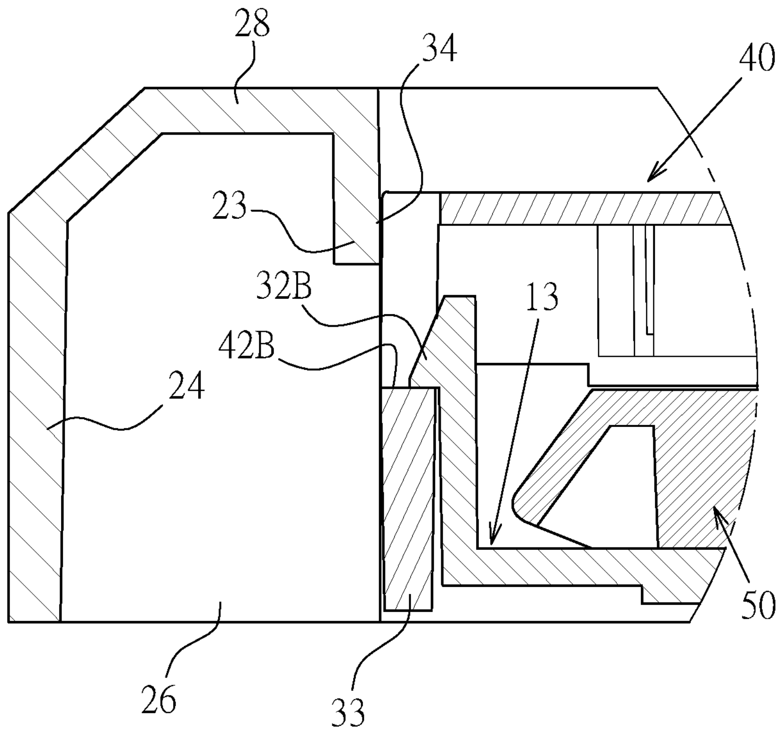
FIG. 9 is a perspective view of another embodiment of the buckle assembly of the buckle type limiting piece according to the invention.

Referring to FIGS. 3 and 4, in the present embodiment, the snap part 32 on the second side inner wall 23 is configured in the form of a tooth (or a slot), and the buckle end 42 of the buckle type limiting piece 40 is correspondingly configured in the form of a slot (or a tooth). Further variations of the buckle positioning design in this part are depicted in FIG. 9. The snap part 32B can also be configured in the form of a slot formed on the structure of the tool bar placement zone 13, and the buckle end 42B of the buckle type limiting piece 40 can be correspondingly configured in the form of a tooth to buckle with the snap part 32B. In the present embodiment, the user also pulls and controls the operation part 33 from the second side opening 26 to release the snap part 32B.

Referring to FIG. 2, in the present embodiment, the pressing section 43 of the buckle type limiting piece 40 is further configured with a plurality of auxiliary tool placement parts 44, and the auxiliary tool placement parts 44 have a shape similar to or different from those tool positioning parts 53 of the tool bar 50.

Referring to FIGS. 2 and 3, in the present embodiment, the insertion end 41 of the buckle type limiting piece 40 is further formed with a hook part 45, to generate a buckling effect when the insertion end 41 and the insertion part 31 are relatively aligned to each other and assembled (Note: also offering the function of lock check).

Referring to FIG. 3, in the present embodiment, the top parts of the first side inner wall 21 and the first side outer wall 22 are connected through a first side top wall 27. The top arts of the second side inner wall 23 and the second side outer wall 24 are connected through a second side top wall 28. (Note: The first side top wall 27 can also be omitted, so that the first side outer wall 22 can be connected with the first side inner wall 21 in a shape with an arched or tilted cross section. This shape can also be applied between the top parts of the second side inner wall 23 and the second side outer wall 24).

Referring to FIG. 4, in the present embodiment, the tool bar placement zone 13 of the plate body 10 is formed with a convex shaft 14 respectively at the positions corresponding to the first end 51 and the second end 52 of each tool bar 50, and the first end 51 and the second end 52 of each tool bar 50 are respectively formed with a corresponding positioning hole 54 for insertion and positioning.

Figure 5:
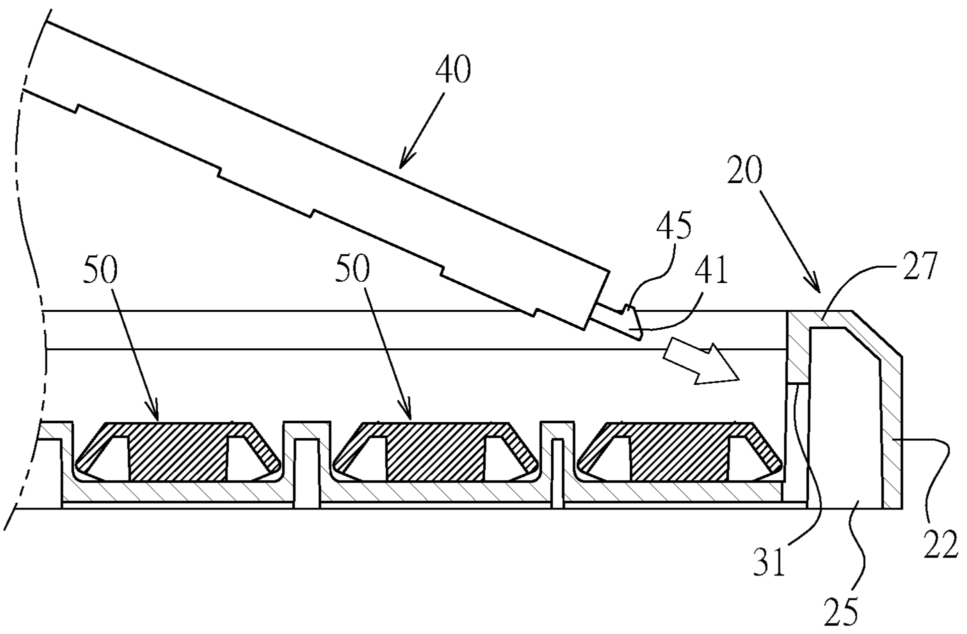
FIG. 5 is a schematic view I of the assembly steps of the buckle type limiting piece in a preferred embodiment of the invention.
Figure 6:
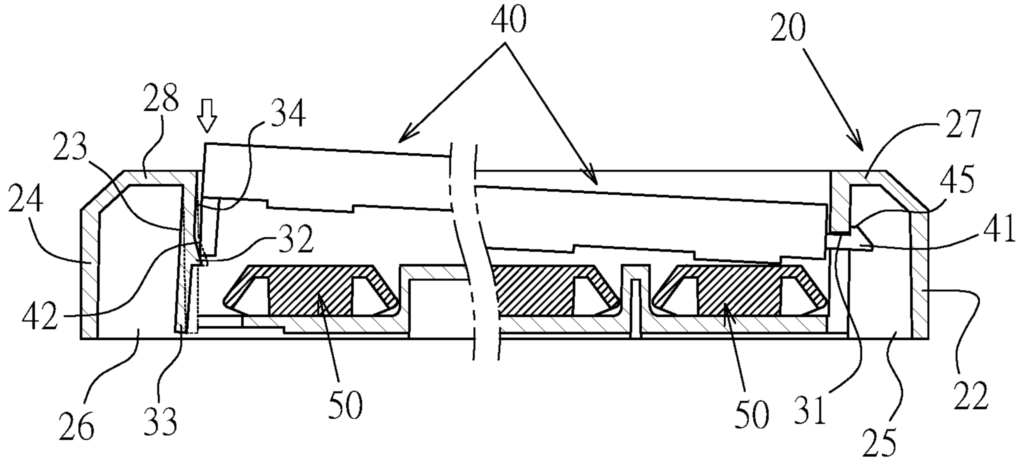
FIG. 6 is a schematic view II of the assembly steps of the buckle type limiting piece in a preferred embodiment of the invention.
Figure 7:
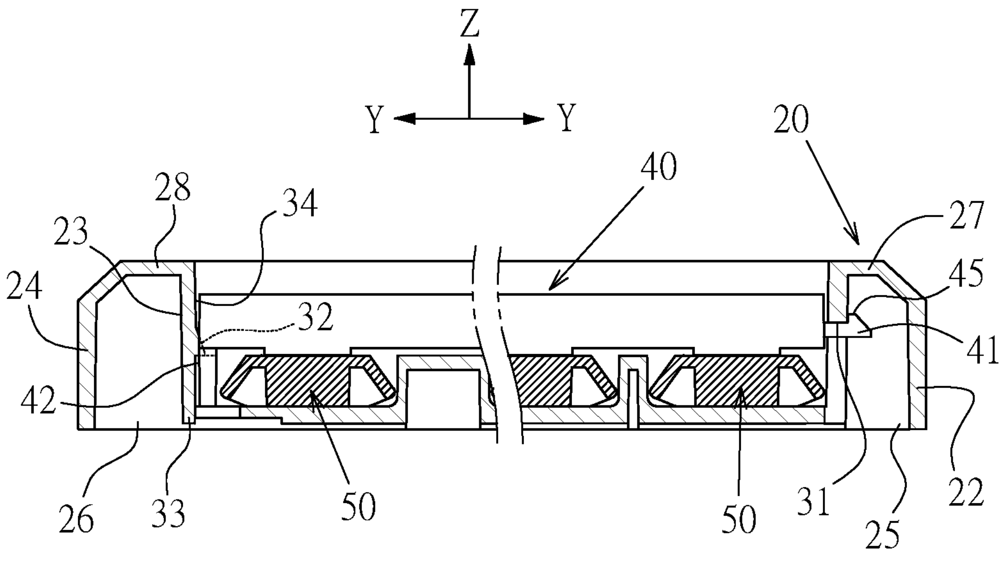
FIG. 7 is a schematic view III of the assembly steps of the buckle type limiting piece in a preferred embodiment of the invention.
Figure 8:
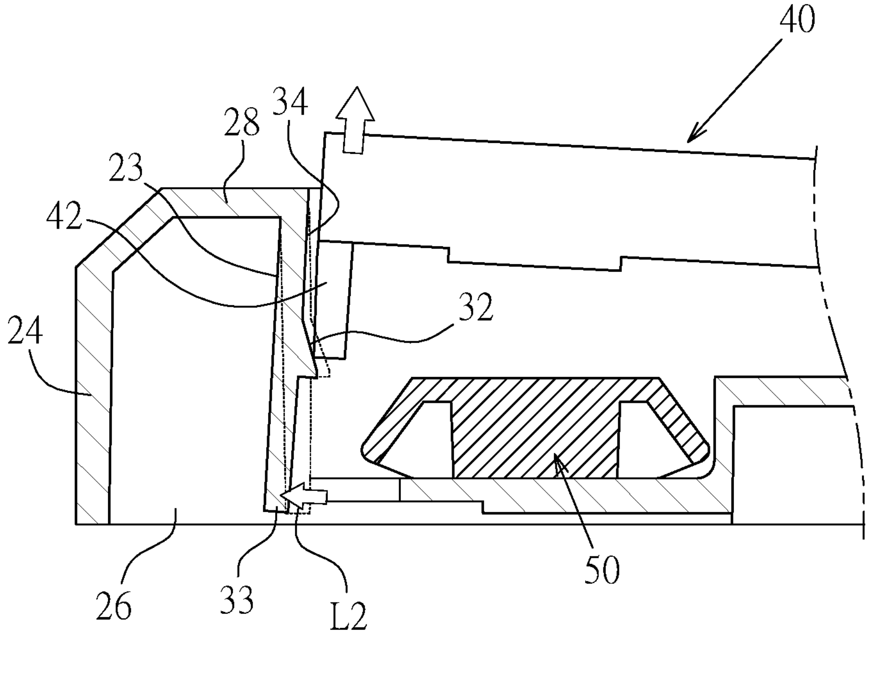
FIG. 8 is a schematic view of the released state of the buckle type limiting piece in a preferred embodiment of the invention.

Based on the above structural constitution and technical features, the operation of the buckle type tool bar placement plate disclosed in the present invention is depicted in FIG. 4. When the user wants to position each tool bar 50, each tool bar 50 is moved along the vertical direction Z and is placed into the tool bar placement zone 13, so that the first end 51 is assembled toward first end directional edge 11 of the plate body 10, whereas the second end 52 is assembled toward the second end directional edge 12 (see FIG. 2). Then, as shown in FIG. 5, the insertion end 41 of the buckle type limiting piece 40 and the insertion part 31 of the side snap unit 30 are aligned to and assembled with each other. Then, as shown in FIG. 6 and FIG. 7, the buckle end 42 is aligned to and assembled with the snap part 32 of the side snap unit 30, and now, it can be pressed on the tool bar 50 structure through the pressing section 43 of the buckle type limiting piece 40, so that each tool bar 50 can be positioned in the vertical direction Z. As the tool bar 50 of the present invention is placed along the vertical direction Z into the tool bar placement zone 13, during the placement, no movement in the shaft length direction X is needed (Note: Also, the tool bar 50 does not have to lose a placement length for the positioning buckle to slide in along the axial direction). Therefore, the shaft length of the plate body 10 can be minimized to save material and transportation costs. Furthermore, through the structural design of the double-layer frame edge 20, the insertion end 41 and buckle end 42 of the buckle type limiting piece 40 are both hidden inside the inner wall structure (i.e., the first side inner wall 21 and the second side inner wall 23), not easily accessed by the user. To release the tool bar 50, the user must operate and control the operation part 33 from the second side opening 26 on the bottom (as indicated by Arrow L2 in FIG. 8). Therefore, the present invention offers better operational safety. On the other hand, as the buckle of the buckle type limiting piece 40 is along the lateral direction Y, the fall of the buckle type tool bar placement plate will be along the shaft length direction X. Hence, through the buckle type limiting piece 40, the tool bar 50 can be positioned more stably and will not fall apart easily.

I claim:

1. A buckle type tool bar placement plate with minimum shaft length, said buckle type tool bar placement plate comprising:

a plate body, having a tool bar placement zone, wherein, based on the extension direction of the tool bar placement zone, a shaft length direction and a lateral direction perpendicular to the shaft length direction are defined, the two ends in the shaft length direction away from each other are formed with a first end directional edge and a second end directional edge, and a vertical direction is defined to be perpendicular to the tool bar placement zone, wherein, a shaft length is relatively defined between the first end directional edge and the second end directional edge;

at least one double-layer frame edge, configured at the at least one corresponding position on the first end directional edge or the second end directional edge, wherein, in the lateral direction, the at least one double-layer frame edge comprises a first side inner wall, a first side outer wall and a second side inner wall, and a second side outer wall configured at intervals, a first side opening is formed between the bottom parts of the first side inner wall and the first side outer wall, a second side opening is formed between the bottom parts of the second side inner wall and the second side outer wall, and specifically, the second side inner wall can be pulled by a force and can be automatically reset through its elasticity;

at least one side snap unit, configured on the at least one double-layer frame edge, comprising an insertion part configured on the first side inner wall, snap part configured on the second side inner wall, and an operation part to release the snap part, and the operation part must be operated from the second side opening; and the at least one side snap unit further comprises a limiting piece abutting edge, so that the snap part can be configured between the limiting piece abutting edge and the operation part; and at least one buckle type limiting piece, configured along the lateral direction, the at least one buckle type limiting piece comprising an insertion end, a buckle end and a pressing section located between the insertion end and the buckle end, wherein the insertion end is to be aligned to and assembled with the insertion part of the at least one side snap unit, and the buckle end is to be aligned to and assembled with the snap part of the at least one side snap unit.

2. The buckle type tool bar placement plate with minimum shaft length defined in claim 1, wherein the tool bar placement zone of the plate body is used for placing and limiting a plurality of tool bars, each tool bar is in the shape of a long bar, defined with a first end and a second end, between the first end and the second end, there are a plurality of tool positioning parts, the first end is assembled toward the first end directional edge of the plate body, and the second end is assembled toward the second end directional edge, so that each tool bar can move along the vertical direction and be placed into the tool bar placement zone, and is then pressed on the tool bar structure through the pressing section of the at least one buckle type limiting piece, thus each tool bar is limited in the corresponding vertical direction.

3. The buckle type tool bar placement plate with minimum shaft length defined in claim 1, wherein the snap part of the second side inner wall is configured in any form of a tooth or a slot, and the buckle end of the at least one buckle type limiting piece is correspondingly configured in the form of a slot or a tooth.

4. The buckle type tool bar placement plate with minimum shaft length defined in claim 2, wherein the pressing section of the at least one buckle type limiting piece is further configured with a plurality of auxiliary tool placement parts, the auxiliary tool placement parts have a shape similar to or different from those tool positioning parts of the tool bar.

5. The buckle type tool bar placement plate with minimum shaft length defined in claim 1, wherein the insertion end of the at least one buckle type limiting piece is further formed with a hook part, to generate a buckling effect when the insertion end and the insertion part are relatively aligned to each other and assembled.

6. The buckle type tool bar placement plate with minimum shaft length defined in claim 1, wherein the top parts of the first side inner wall and the first side outer wall are connected through a first side top wall; the top parts of the second side inner wall and the second side outer wall are connected through a second side top wall.

* * * * *